(12) United States Patent
Patil et al.

(10) Patent No.: US 11,941,252 B2
(45) Date of Patent: Mar. 26, 2024

(54) METHOD FOR REDUCING SOLID-STATE DEVICE (SSD) OPEN TIME AND SYSTEM THEREOF

(71) Applicant: SAMSUNG ELECTRONICS CO., LTD., Suwon-si (KR)

(72) Inventors: Tushar Tukaram Patil, Bengaluru (IN); Anantha Sharma, Bengaluru (IN); Sharath Kumar Kodase, Bengaluru (IN); Suman Prakash Balakrishnan, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 17/884,018

(22) Filed: Aug. 9, 2022

(65) Prior Publication Data

US 2023/0400987 A1 Dec. 14, 2023

(30) Foreign Application Priority Data

Jun. 9, 2022 (IN) .............................. 202241033113

(51) Int. Cl.
*G06F 3/06* (2006.01)

(52) U.S. Cl.
CPC .......... *G06F 3/0617* (2013.01); *G06F 3/0655* (2013.01); *G06F 3/0679* (2013.01)

(58) Field of Classification Search
CPC ..... G06F 3/0617; G06F 3/0655; G06F 3/0679
See application file for complete search history.

(56) References Cited

U.S. PATENT DOCUMENTS

2015/0046670 A1\* 2/2015 Kim .................... G06F 12/0246
711/207

\* cited by examiner

*Primary Examiner* — Gurtej Bansal
(74) *Attorney, Agent, or Firm* — Sughrue Mion, PLLC

(57) ABSTRACT

Provided are methods, apparatuses, systems, and computer-readable storage media for reducing an open time of a solid-state drive (SSD). In an embodiment, a method includes dividing a logical-to-physical (L2P) address mapping table of the SSD into a plurality of segments. The method further includes assigning one journal buffer of a plurality of journal buffers to each segment of the plurality of segments. The method further includes recreating, during a power on sequence of the SSD, a portion of the plurality of segments by replaying a first subset of the plurality of journal buffers. The method further includes sending, to a host device, a device-ready signal upon successful recreation of the portion of the plurality of segments. The method further includes recreating, in a background mode, a remaining portion of the plurality of segments by replaying a second subset of the plurality of journal buffers.

20 Claims, 4 Drawing Sheets

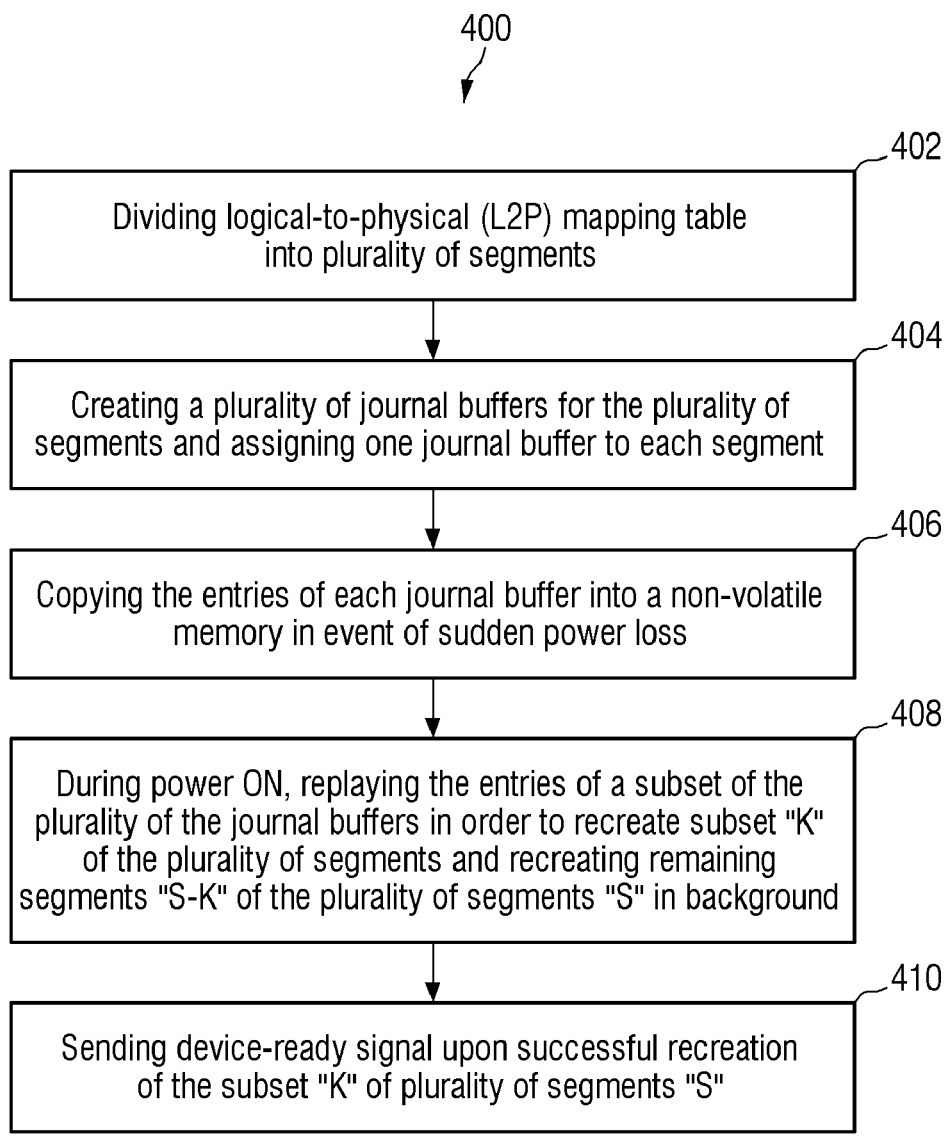

METHOD FOR REDUCING SOLID-STATE DEVICE (SSD) OPEN TIME AND SYSTEM THEREOF

CROSS-REFERENCE TO RELATED APPLICATIONS

This application is based on and claims priority under 35 U.S.C. § 119 to Indian Patent Application No. 202241033113, filed on Jun. 9, 2022, in the Indian Patent Office, the disclosure of which is incorporated by reference herein in its entirety.

BACKGROUND

1. Field

The present disclosure relates generally to memory devices. More particularly, the present disclosure describes systems and methods for reducing open time of memory devices.

2. Description of Related Art

The following description includes information that may be useful in understanding the present invention. It is not an admission that any of the information provided herein is related art or relevant to the presently claimed invention, or that any publication specifically or implicitly referenced is related art.

Computing devices may require memory devices to store data. The memory devices may generally be one of two types, such as, volatile memory and non-volatile memory, for example. A volatile memory device may lose the stored data in the event of a power loss. However, a non-volatile memory device may retain the stored data in the event of the power loss. As a result, non-volatile memory devices may be widely used by computing devices.

The data stored in the memory device (e.g., volatile, non-volatile) may be stored at different locations. These different locations may be represented by different physical addresses. That is, each physical address may represent a specific location of the memory device at which data may be stored. However, computing devices may use logical addresses to access memory locations, and, as such, may not be able to access a non-volatile memory device using physical addresses. Therefore, a logical-to-physical (L2P) address mapping table may be maintained to access the different storage locations of the memory device. As the name suggests, the L2P address mapping table maintains a table which maps the logical addresses used by the computing device to corresponding physical addresses of the memory device. Since the L2P address mapping table maintains a mapping of physical addresses of the memory device, the size of the L2P address mapping table may increase in proportion to increases in storage capacity of the memory device. For example, a solid-state device (SSD) (e.g., solid-state drive) with a storage capacity of 4 terabytes (TB) may use a L2P address mapping table with a size of 4 gigabytes (GB). In another example, an 8 TB SSD may use an 8 GB L2P address mapping table. That is, as the storage capacity of the memory device increases, the L2P address mapping table may require a significant amount of memory.

The L2P address mapping table may be stored in a NAND storage of the memory device. However, in the event of memory initialization, the L2P address mapping table may be loaded into a faster (e.g., primary) memory, such as dynamic random access memory (DRAM) of the computing device, for example. Depending on availability of DRAM, the L2P address mapping table may be fully loaded (e.g., full mapping) into the DRAM. Alternatively or additionally, a portion of the L2P address mapping table (e.g., partial mapping) may be loaded in DRAM. Whenever partial mapping is loaded, the remaining mapping may be loaded as and when required (e.g., on-demand loading). Furthermore, the physical addresses of the data stored in the memory device may also change due to write operations, for example, which may result in updates in the L2P address mapping table. Thus, a journal may be maintained that logs updates to the mapping table. Journals are usually saved in faster memory like tightly-coupled memory (TCM). The TCM may be a low-latency memory.

Whenever a particular L2P address mapping table entry is updated, the update may be made in a meta unit in a DRAM which may have a corresponding L2P entry and journal buffer stored in a TCM. For example, the meta unit may be obtained by dividing a meta area, comprising the L2P address mapping table, into small units, which, in general, may have a size of 24 kilobytes (KB) or 28 KB, but is not limited thereto. When the journal buffer is full, the journal and the meta unit may be copied to static random access memory (SRAM), and together the journal and the meta unit may be flushed to the NAND storage. During a power on sequence, the journal buffer may be replayed. Replay of the journal buffer may be performed in a same sequence in which the journal buffer was saved before the power on sequence. The memory device can support commands (e.g., read, write) after completion of the power on sequence, in which the meta data (e.g., L2P address mapping table, journal buffer) is loaded and replayed. During a sudden power-off recovery (SPOR) sequence, a complete journal replay may be necessary, since it may not be possible to detect which journal buffer entries have updates to a meta unit. Thus, replaying of the journal and rebuilding of the meta data may contribute to a higher (e.g., longer) open time during an open (e.g., power on) sequence of the memory device.

Therefore, there exists a need in the art for a technique to reduce the open time of the memory device.

SUMMARY

The present disclosure overcomes one or more shortcomings of the related art and provides additional advantages. Embodiments and aspects of the disclosure described in detail herein are considered a part of the claimed disclosure.

In one non-limiting embodiment of the present disclosure, a method for reducing open time of Solid-State Drive (SSD) open time is disclosed. The method includes dividing a logical-to-physical (L2P) address mapping table of the SSD into a plurality of segments. The method further includes creating a plurality of journal buffers for the plurality of segments. The method further includes assigning one journal buffer of the plurality of journal buffers to each segment of the plurality of segments. Each journal buffer of the plurality of journal buffers stores entries representing changes made, during one or more write operations of the SSD, to the assigned segment of the L2P address mapping table. The method further includes recreating, during a power on sequence of the SSD, a portion of the plurality of segments by replaying a first subset of the plurality of journal buffers corresponding to the portion of the plurality of segments. The method further includes sending, to a host device, a device-ready signal upon successful recreation of the portion of the plurality of segments. The method further includes recreating, in a background mode, a remaining portion of the plurality of segments by replaying a second subset of the plurality of journal buffers corresponding to the remaining portion of the plurality of segments.

In another non-limiting embodiment of the present disclosure, the method further includes, in response to a sudden power loss event, copying entries of each journal buffer of the plurality of journal buffers into a non-volatile memory of the SSD.

In yet another non-limiting embodiment of the present disclosure, the recreating of the remaining portion of the plurality of segments includes replaying, in the background mode, remaining journal buffers of the plurality of journal buffers, in response the successful recreation of the portion of the plurality of segments.

In yet another non-limiting embodiment of the present disclosure, the method further includes determining a quantity of segments in the plurality of segments based on a command timeout time, a power loss protection time, and resources available with the SSD.

In yet another non-limiting embodiment of the present disclosure, the method further includes determining a quantity of segments in the portion of the plurality of segments based on an expected open time and a command timeout time.

In yet another non-limiting embodiment of the present disclosure, the method further includes determining a quantity of segments in the portion of the plurality of segments to be recreated during the power on sequence such that a time to recreate the remaining portion of the plurality of segments is less than a command timeout time.

In yet another non-limiting embodiment of the present disclosure, the method further includes receiving a request to recreate one or more segments of the remaining portion of the plurality of segments in a particular order, and the recreating of the remaining portion of the plurality of segments includes replaying a third subset of the plurality of journal buffers according to the particular order, wherein the third subset of the plurality of journal buffers correspond to the one or more segments indicated by the request.

In yet another non-limiting embodiment of the present disclosure, a system for reducing open time of a SSD is disclosed. The system includes at least one controller, a volatile memory communicatively coupled with the at least one controller, and a non-volatile memory communicatively coupled with the at least one controller and the volatile memory. The at least one processor is configured to divide a logical-to-physical (L2P) address mapping table of the SSD, stored in the volatile memory, into a plurality of segments. The at least one controller is further configured to create a plurality of journal buffers for the plurality of segments. The at least one controller is further configured to assign one journal buffer of the plurality of journal buffers to each segment of the plurality of segments. Each journal buffer of the plurality of journal buffers stores entries representing changes made, during one or more write operations of the SSD to the assigned segment of the L2P address mapping table. The at least one controller is further configured to recreate, during a power on sequence of the SSD, a portion of the plurality of segments by replaying a first subset of the plurality of journal buffers corresponding to the portion of the plurality of segments. The first subset of the plurality of journal buffers has been previously stored in the non-volatile memory. The at least one controller is further configured to send, to a host device, a device-ready signal upon successful recreation of the portion of the plurality of segments. The at least one controller is further configured to recreate, in a background mode, a remaining portion of the plurality of segments by replaying a second subset of the plurality of journal buffers corresponding to the remaining portion of the plurality of segments. The second subset of the plurality of journal buffers has been previously stored in the non-volatile memory.

In yet another non-limiting embodiment of the present disclosure, a non-transitory computer-readable storage medium is disclosed. The non-transitory computer-readable storage medium comprises instructions that are executable by a processing device of a SSD, and cause the SSD to divide a logical-to-physical (L2P) address mapping table of the SSD into a plurality of segments. The instructions further cause the SSD to create a plurality of journal buffers for the plurality of segments. The instructions further cause the SSD to assign one journal buffer of the plurality of journal buffer to each segment of the plurality of segments. Each journal buffer stores entries represent changes made, during one or more write operations of the SSD, to the assigned segment of the L2P address mapping table. The instructions further cause the SSD to recreate, during a power on sequence of the SSD, a portion of the plurality of segments by replaying a first subset of the plurality of journal buffers corresponding to the portion of the plurality of segments. The instructions further cause the SSD to send, to a host device, a device-ready signal upon successful recreation of the portion of the plurality of segments. The instructions further cause the SSD to recreate, in a background mode, a remaining portion of the plurality of segments by replaying a second subset of the plurality of journal buffers corresponding to the remaining portion of the plurality of segments.

In yet another non-limiting embodiment of the present disclosure, an apparatus for reducing open time of a SSD is disclosed. The apparatus includes a plurality of journal buffers, a non-volatile memory, a volatile memory, and at least one processor. The plurality of journal buffers are configured to store entries representing changes made to a corresponding segment of a logical-to-physical (L2P) address mapping table, during one or more write operations of the SSD. The non-volatile memory is configured to store the plurality of journal buffers when the SSD is powered-off. The a volatile memory is configured to store the plurality of journal buffers when the SSD is powered-on. The least one processor is communicatively coupled with the non-volatile memory and the volatile memory. The at least one processor is configured to recreate, during a power on sequence of the SSD, a portion of the plurality of segments by replaying a first subset of the plurality of journal buffers corresponding to the portion of the plurality of segments. The first subset of the plurality of journal buffers have been previously stored in the non-volatile memory. The at least one processor is further configured to send, to a host device, a device-ready signal upon successful recreation of the portion of the plurality of segments. The at least one processor is further configured to recreate, in a background mode, a remaining portion of the plurality of segments by replaying a second subset of the plurality of journal buffers corresponding to the remaining portion of the plurality of segments. The second subset of the plurality of journal buffers have been previously stored in the non-volatile memory.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying figures, in which:

FIG. 4 illustrates a flowchart of an exemplary method for reducing SSD open time, in accordance with an embodiment of the present disclosure.

Figure 1:
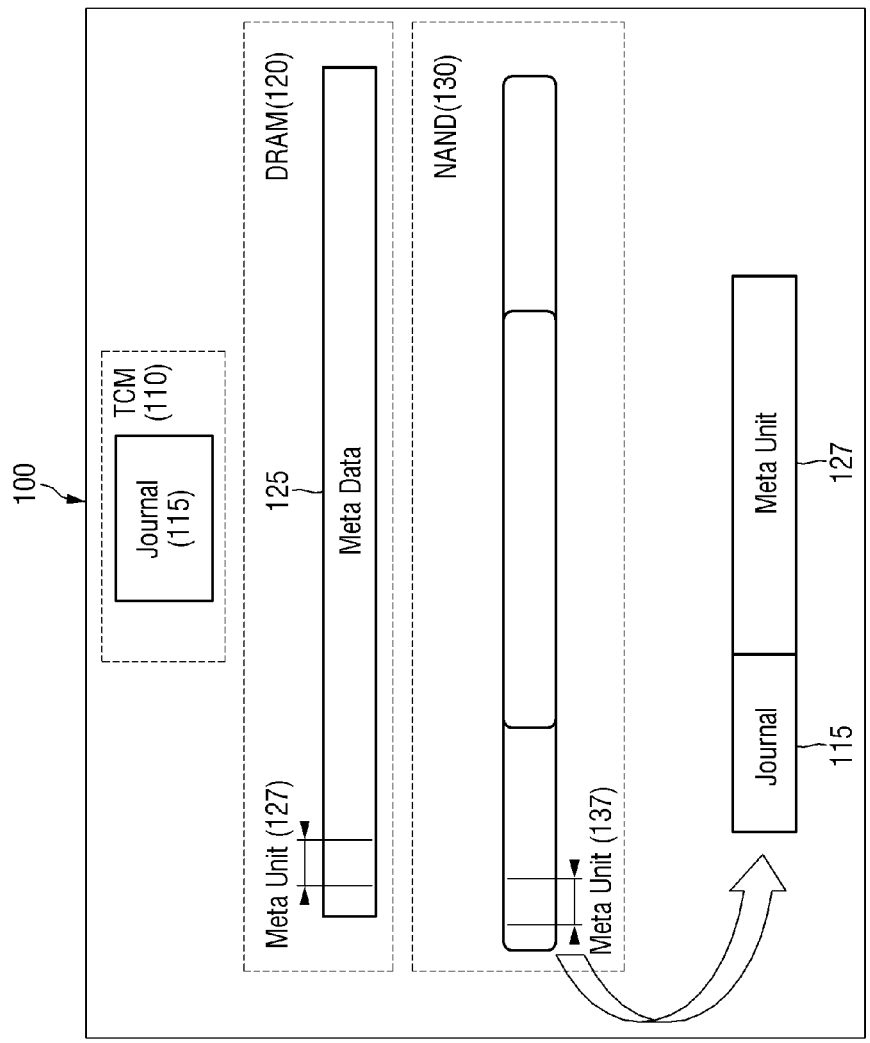
FIG. 1 illustrates a related arrangement of a logical-to-physical (L2P) address mapping table and a journal buffer in a memory device.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer readable medium and executed by a computer or processor, whether or not such computer or processor is explicitly shown.

DETAILED DESCRIPTION

The foregoing description broadly outlines the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates to techniques for reducing open time of a memory devices by dividing the logical-to-physical (L2P) mapping table into a plurality of segments. The memory device may be a solid-state device (SSD), a NAND flash based storage device, or any other volatile or non-volatile memory device. For memory devices, such as SSD products, open time may be an important parameter for selecting a product feature. Memory device products with large drive sizes (e.g, 4 terabyte (TB) to 16 TB, and above) may exhibit open times of a significant magnitude. The present disclosure potentially reduces open times for memory devices in a wide range of drive sizes when compared to related techniques. The open time of the memory device may be measured from power on of the memory device until the completion of a first command by the memory device.

The open time of the memory device may be critical for various reasons. For example, if the memory device is used as a boot drive of a system, the system may complete the boot sequence in a shorter amount of time if the open time of the memory device is reduced. In another example, when the memory device is hot plugged in, the device may be ready to use faster, if the open time of the memory device is reduced. On related memory devices, such as an SSD, the L2P address mapping table may be saved in non-volatile memory such as NAND flash based storage, but is not limited thereto. As such, a significant factor of the open time of such a memory device may be a time required to preparing the memory device for use by loading the L2P address mapping table from a non-volatile memory of the memory device to a volatile memory of the memory device, such as dynamic random-access memory (DRAM), but not limited thereto. The DRAM may be a type of memory that may be used for storing data and/or program code needed by a processor to function.

The size of the L2P address mapping table may increase in proportion to increases in storage capacity of the memory device. For example, an SSD (e.g., solid-state drive) with a storage capacity of 4 TB may use a L2P address mapping table with a size of 4 gigabytes (GB). In another example, an 8 TB SSD may use an 8 GB L2P address mapping table. The L2P address mapping data stored in the volatile memory of the memory device may be updated frequently during write operations of the memory device. Further, the L2P address mapping data may need to be flushed to non-volatile memory storage periodically according to one or more policies. For example, one such policy may limit a quantity and/or frequency of updates (e.g., flushes) to non-volatile memory which may result in an increased write amplification factor (WAF) for the memory device. In another example, a policy may limit a quantity of updates stored in volatile memory which may increase a time to re-create (e.g., replay) the updates during a power-on sequence. To implement these policies, the memory device may maintain a journal and/or one or more meta units. The journal may comprise updates to the meta data. For example, for updates to the L2P meta data, the journal may comprise a new (e.g., after the update) physical page number (PPN) and/or an old (e.g., prior to the update) PPN. Alternatively or additionally, an area in the volatile memory (e.g., DRAM) storing the meta data may be divided into meta units. Each of the meta units may have a same size (e.g., storage capacity), for example, the meta units may have a 32K size, but the disclosure is not limited in this regard.

FIG. 1 illustrates a related arrangement of an L2P address mapping table and a journal buffer in a memory device 100.

As shown in FIG. 1, a journal 115 may be stored in a TCM 110. When a copy of the meta data is loaded into DRAM 120 (e.g., volatile memory) from non-volatile memory (e.g., NAND 130) as meta data 125, the meta data 125 may be divided into meta units 127, each having a same size (e.g., 32 KB minus a size of the journal 115). However, the actual meta data may be stored in the NAND memory 130 (e.g., non-volatile memory). Thus, meta data in the non-volatile memory NAND 130 may be divided into meta units 137, each having a same size (e.g., 28 KB). The meta units 137 may comprise at least a portion of the journal 115 and the corresponding meta unit 127. The size of the meta unit 137 in the non-volatile NAND memory 130 may be a multiple of the size of the meta unit 127 in the volatile DRAM memory 120 in order to avoid a garbage collection process in the meta data 125.

In related techniques, a large number of journal buffer and meta unit replay may be performed in order to recreate a L2P address mapping table during a power on sequence, which may consume a significant amount time, and, as such, cause a high (e.g., long duration) open time for the memory device 100. Alternatively or additionally, these complete replay updates may be necessary to recreate the L2P address mapping table to be in a same state as before the memory device was powered off (e.g., prior to a power off sequence). Aspects of the present disclosure may reduce the open time of a memory device irrespective of techniques used for meta data flush and meta data replay during a power on sequence. For ease of reference, related techniques used for maintaining the meta data may be referred to as 'consecution' in the present disclosure.

As discussed above, the replaying of the journal and the rebuilding of meta data may contribute to higher (e.g., longer) open times during an open (e.g., power on) sequence of a memory device. For example, an SSD memory device having a 4 TB storage capacity with an open time of approximately 10 seconds may require approximately 9 seconds to rebuild the meta data. For another example, an SSD memory device having a 8 TB storage capacity with an open time of approximately 15 seconds may require approximately 14 seconds to rebuild the meta data. The present disclosure describes a segmented consecution policy that may improve the meta data rebuild time, when compared to related consecution policies, and thereby potentially improve the open time of an SSD memory device.

According to an embodiment, the present disclosure may divide the L2P address mapping table into segments. That is, a memory device may divide the L2P address mapping table into S segments (where S is a positive integer greater than 1) and perform consecution separately on each segment of the S segments, with proper management of dependencies between the S segments (e.g., inter-dependencies).

Figure 2:
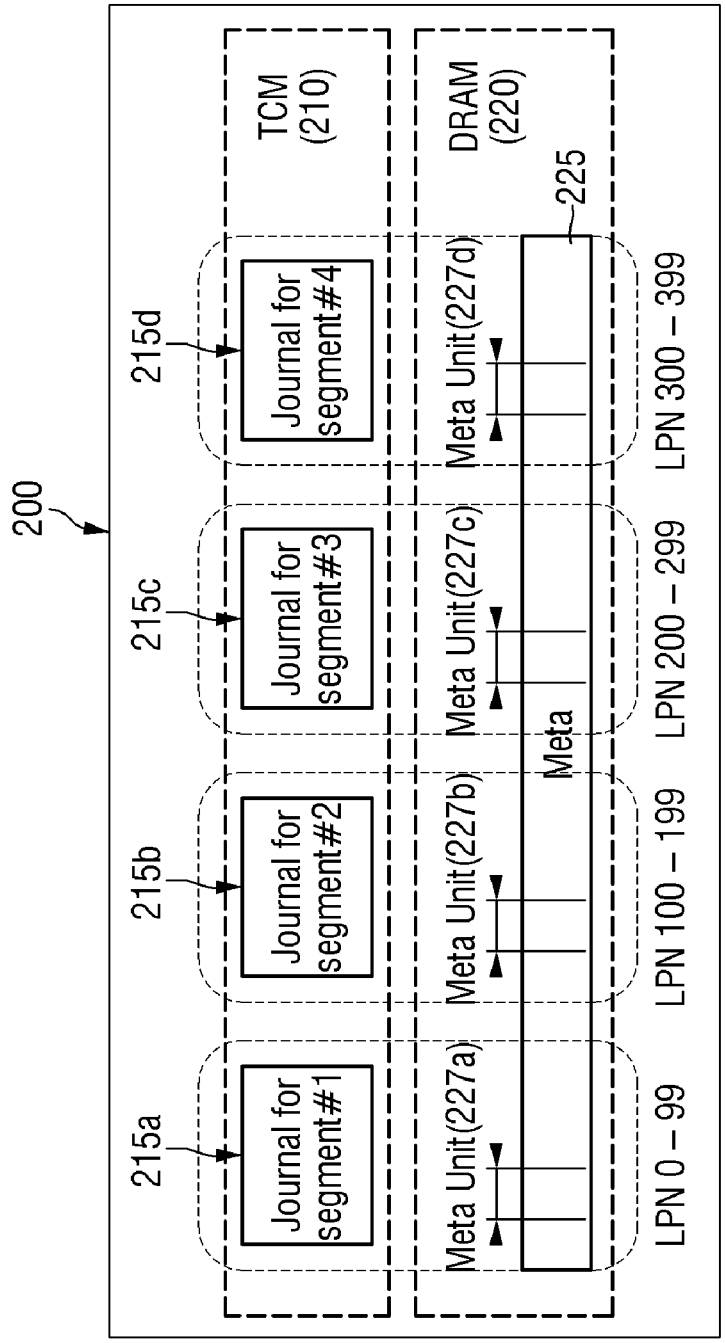
FIG. 2 illustrates an example segmentation arrangement of an L2P address mapping table and a journal buffer in a memory device, in accordance with an embodiment of the present disclosure.

FIG. 2 illustrates an example segmentation arrangement of an L2P address mapping table and a journal buffer in a memory device, in accordance with an embodiment of the present disclosure As shown in FIG. 2, each segment (e.g., 227a-227d, hereinafter "227") of the L2P address mapping table may be assigned a separate independent journal buffer (e.g., 215a-215d, hereinafter "215"). For example, if the L2P address mapping table comprises 400 logical page number (LPN) entries (e.g., LPN 0-399), a first meta unit 227a may comprise entries LPN 0-99 and be assigned first journal buffer 215a, a second meta unit 227b may comprise entries LPN 100-199 and be assigned second journal buffer 215b, a third meta unit 227c may comprise entries LPN 200-299 and be assigned third journal buffer 215c, and fourth meta unit 227d may comprise entries LPN 300-399 and be assigned fourth journal buffer 215d. Alternatively or additionally, a single segment 227 may be assigned multiple journal buffers 215 (not shown). Alternatively or additionally, multiple segments 227 may be assigned to one of the journal buffers 215 (not shown). The present disclosure is not limited in this regard.

In related techniques, the L2P address mapping table may not be segmented (e.g., meta data 125 of FIG. 1) and/or may be assigned to one journal buffer (e.g., journal buffer 115 of FIG. 1). However, according to some embodiments, the meta data 225 stored in the volatile memory DRAM 220 may be segmented into S segments (e.g., meta units 227), each segment 227 of the S segments being assigned an independent journal buffer 215 from S journal buffers, such that each journal buffer 215 may perform L2P address map updates related to the corresponding segment 227 only, thus preventing dependency on other segments 227.

Alternatively or additionally, in the event of a sudden power off (SPO), the journal buffers 215 may be saved into a flash memory using direct-current (DC) power loss protection (PLP) capacitors. As such, during a subsequent power on sequence, only a subset K (where K is a positive integer that is less than S) of the plurality of S segments may be recreated by replaying corresponding journal buffers 215 from the non-volatile memory to make the memory device 200 ready to take commands (e.g., read, write). Since, the journal buffers 215 and the segments 227 are independent to each other, the memory device 200 may be made available to take commands by recreating and/or loading a subset of segments and remaining segments may be created in background. In this manner, aspects of the present disclosure may reduce the open time of an SSD memory device.

Figure 3:
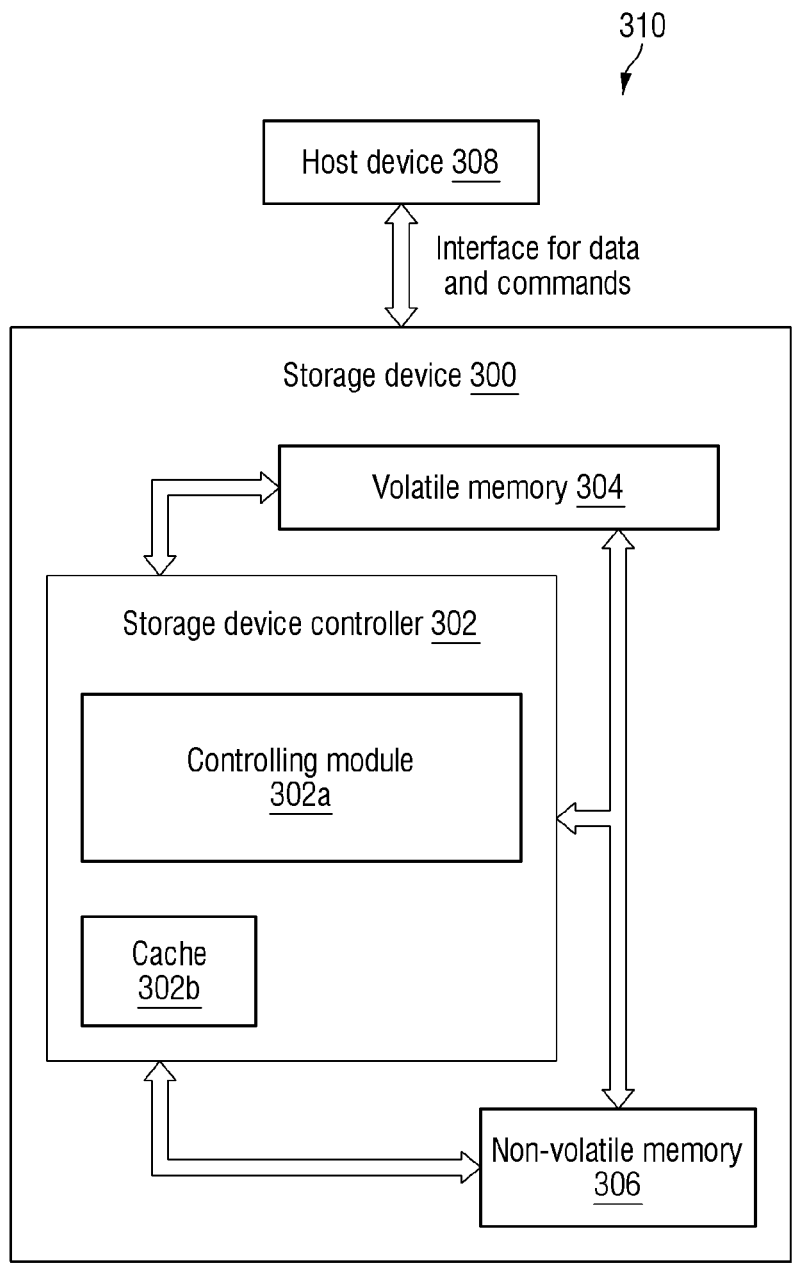
FIG. 3 illustrates a block diagram of an environment having a system for reducing solid-state device (SSD) open time, in accordance with an embodiment of the present disclosure.

FIG. 3 shows a block diagram of an environment comprising an exemplary system for reducing SSD open time in accordance with some embodiments of the present disclosure. The environment 310 comprises at least the following entities, but is not limited to, a storage device 300 and a host device 308. The host device 308 may be a computer, a desktop computer, a notebook computer a laptop computer, a tablet computer, a server, a smart phone, a smart tablet, a personal digital assistant (PDA), a cellular phone, a multimedia device, a wearable device, but is not limited thereto. The storage device 300 may refer to an SSD and/or a device having non-volatile storage capability, such as, but not limited to, a NAND flash memory, a phase-change RAM (PRAM), a magnetic RAM (MRAM), a resistive RAM (RRAM), and a ferroelectric RAM (FRAM).

The storage device 300 may comprise at least a storage device controller 302, a volatile memory 304, and a non-volatile memory 306, which may be communicatively and/or or electrically coupled to each other. The storage device controller 302 may comprise a controlling module 302a that may consist of one or more processors (e.g., central processing units (CPUs), microprocessors, microcontrollers, digital signal processors (DSPs), reduced instruction set computing (RISC) processors, field programmable gate arrays (FPGAs), programmable logic devices (PLDs), state machines, gated logic, discrete hardware circuits, and other suitable hardware) configured to execute one or more software programs. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. Accordingly, in one or more example embodiments, the functions described herein may be implemented in hardware, software, or any combination thereof.

The storage device controller 302 may further comprise a cache 302b that may consist of other cache memories, such as TCM. The volatile memory 304 may be implemented using DRAM, but is not limited thereto. The non-volatile memory 306 may be implemented using NAND flash based memory, but is not limited thereto. It may be understood to a skilled person that the environment 310 shown in FIG. 3 is for purpose of example only. That is, there may be any number of environments through which the present disclosure may be implemented. In the present environment 310, all entities are shown as single entities for ease of illustration and understanding, but it must be understood that there may be multiple numbers of entities such as multiple controllers and/or multiple storage devices. Further, the storage device controller 302 may comprise a dedicated or general-purpose processor or any computing device acting as a processing unit, which may be connected with various other entities and may control their operations to achieve the objective of the present disclosure. These entities may communicate with each other via wired and/or wireless communication link. For example, the interface protocol between the host device 308 and the storage device 300 may be comply with one or more standards, such as, but not limited to, serial advanced technology attachment (SATA), small computer system interface (SCSI), serial attached SCSI (SAS), Peripheral Component Interconnect (PCI), PCI Express (PCIe), and Non-Volatile Memory Express (NVME). Further, these entities may comprise suitable hardware or software or combination thereof, which may perform the desired operation of the entities.

According to an embodiment of the present disclosure, the volatile memory 304 may store the L2P address mapping table of the storage device 300. The storage device controller 302, which may be communicatively and operationally coupled with the volatile memory 304 and the non-volatile memory 306, may divide the L2P address mapping table of the storage device 300, stored in the volatile memory 304, into a plurality of S segments, where S is a positive integer greater than 1. The storage device controller 302 may create a plurality of S journal buffers 215 for the plurality of S segments and may assign one journal buffer 215 to each segment. Each journal buffer 215 may store entries representing changes to a corresponding segment of the L2P address mapping table made during write operations.

In the event of a sudden power loss (e.g., SPO), the storage device controller 302 may be configured to copy the entries of each journal buffer 215 from the volatile memory 304 into the non-volatile memory 306. The non-volatile memory 306 may be a flash memory and the journal buffers 215 may be stored in the flash memory using DC PLP capacitors, for example. In related techniques, only one journal buffer 115 may need to be saved into a non-volatile memory in the event of an SPO. However, in accordance with some embodiments of the present disclosure, the plurality of journal buffers 215 has to be stored in the non-volatile memory 306. In some embodiments, the size of one journal buffer 215 may be 4 KB, for example, and, consequently, 4×S KB may need to be stored in the non-volatile memory 306 in the event of an SPO. Therefore, the value of S may be selected such that the storage device controller 302 may have sufficient time to store the S journal buffers 215 in the non-volatile memory 306 in the event of an SPO.

In some embodiments, a DC PLP capacitor may provide a power off time of up to 15 milliseconds (msec) to store the S journal buffers 215 in the event of an SPO. Such a power off time may allow the storage device controller 302 to store several megabytes of data in the non-volatile memory 306, which should be sufficient to recreate the condition (e.g., state) of the SSD during a power on sequence or during a sudden power-off recovery (SPOR) sequence. Therefore, the value of S should be such that the total data of the journal buffers 215 (e.g., 4 KB×S) can be saved during an SPO scenario.

In other embodiments, the value of S may be determined to be sufficient to have an added advantage during a power on sequence, and/or determined so as not to cause a time-out during a 'Demand Open' condition. A 'Demand Open' policy may require that a corresponding journal be replayed to recreate the corresponding segment based on a request and/or a demand. Until the corresponding segment is recreated and/or loaded, a read and/or a write request on the corresponding segment cannot be completed. Thus, the value of S should be sufficiently high (e.g., large) to reduce the open time of one segment below a time out value of the 'demand open' request. In such a scenario, the 'Demand Open' policy may help to reduce an open time of the SSD (e.g., storage device 300), without necessarily having an impact on other parameters of the host device 308. Thus, the value of S may be calculated in such a manner which may meet the above-mentioned criteria. According to other embodiments, the value of S may be determined based at least on one of a command timeout time, a power loss protection time, and resources available with the storage device 300 (e.g., SSD).

According to some embodiments, the number of segments opened during a power on sequence may be customized to reduce the open time. For example, the storage device controller 302 may open K segments (where K is a positive integer less than S) during the power on sequence and the remaining segments (e.g., S minus K segments) may be opened in the background (e.g., after the power on sequence has completed). The storage device controller 302 may replay the entries of a subset of the plurality of the journal buffers 215 stored in the non-volatile memory 306 in order to recreate the subset K of the plurality of S segments, and recreate the remaining S−K segments of the plurality of S segments in the background. The subset of the journal buffers 215 which are replayed during the power on sequence may correspond to the subset K of the plurality of S segments.

According to some embodiments of the present disclosure, the storage device controller 302 may recreate the remaining S−K segments of the plurality of S segments in the background by replaying the remaining journal buffers 215 of the plurality of journal buffers in the background, upon the successful recreation of the subset K of the plurality of S segments. In other embodiments, the number of segments to be recreated during the power on sequence may be selected such that a time to recreate the remaining S−K segments is less than command timeout time.

According to some embodiments of the present disclosure, the number of segments in the subset K of the plurality of S segments to be recreated during the power on sequence may be determined based on an expected open time and command timeout time. The calculation of K may be understood with use of the following example. For example, assuming that the number S of segments in the plurality of segments is equal to 28. Thus, the time $T_1$ to load one segment would be 0.5 seconds if the time $T_{TOTAL}$ to load the plurality of segments is 14 seconds, for example, as shown in Eq. 1 below.

$$T_1 = \frac{T_{TOTAL}}{S} = \frac{14 \sec}{28} = 0.5 \sec \qquad [\text{Eq. 1}]$$

Therefore, a maximum time taken by a demand open request may be the same as the time $T_1$ to load one segment which is 0.5 seconds.

For another example, assuming that a desired (e.g., new) open time $T_{OPEN}$ is 10 seconds (rather than the 14 seconds of the previous example). That is the subset K of the plurality of S segments needs to be loaded within the time duration $T_{OPEN}$ of the power on sequence. Thus, a time to recreate and/or load the subset of K segments is the desired open time $T_{OPEN}$, or 10 seconds. Accordingly, the value of K may be calculated using Eq. 2 below.

$$K = \frac{T_{OPEN}}{T_1} = \frac{10 \text{ sec}}{0.5 \text{ sec}} = 20 \quad [\text{Eq. 2}]$$

Accordingly, the storage device controller 302 may recreate a subset of K=20 segments of the plurality of S=28 segments during the power on sequence and, thereafter, the storage device controller 302 may generate and send a device-ready signal upon successful recreation of the subset of K=20" segments of the plurality of S=28 segments to reduce the SSD open time, while recreating the remaining S−K (i.e., 28−20=8) segments of the plurality of S=28 segments in the background. In this manner, the reduced open time may be $T_{OPEN}$=10 seconds.

According to other embodiments of the present disclosure, if the received command refers to one or more segments which are not recreated yet, those one or more segments may be recreated on demand before the command timeout time expires. In other embodiments, a worst case scenario may involve a scenario where the received command refers to the 8 remaining segments which are not recreated during the power on sequence. In such embodiments, the total time to load the 8 remaining segments may be 4 seconds (e.g., $8 \times T_1 = 8 \times 0.5$ sec=4 sec), which may be less than the command timeout time (e.g., 8 seconds). In this manner, aspects of the present disclosure comply with the criteria of the 'demand open' policy, even in a worst case scenario, while reducing the open time of the memory device.

Table 1 shows exemplary data representing reduced open times $T_{OPEN}$ achieved by segmentation of the L2P address mapping table, as described in the present disclosure. Table 1 shows reduced open time $T_{OPEN}$ values for different values of S (e.g., number of segments). As shown in the highlighted cells of Table 1, an open time of 10 seconds may be ensured by segmenting the L2P address mapping table into 6 or more segments (e.g., S>=6).

TABLE 1

| Value of S | 2 | 3 | 4 | 6 | 8 | 16 | 32 |
|---|---|---|---|---|---|---|---|
| Time to Load 1 segment (sec) (14/S) | 7 | 4.67 | 3.5 | 2.33 | 1.75 | 0.875 | 0.4375 |
| Max Segments Loaded Within Command Timeout (8 sec) | 1 | 1 | 2 | 3 | 4 | 9 | 18 |
| Segments To Be Opened Before (K) | 1 | 2 | 2 | 3 | 4 | 7 | 14 |
| Open Time (sec) Best (K segments) | 7 | 9.33 | 7 | 7 | 7 | 6.125 | 6.125 |
| Open Time (sec) Worst (K + 1 segment) | 14 | 14 | 10.5 | 9.33 | 8.75 | 7 | 6.5625 |

According to some embodiments of the present disclosure, the storage device controller 302 may receive a request to recreate one or more of the remaining S−K segments in a particular order, which may be picked on the basis of logical page numbers (LPN). In response, the storage device controller 302 may replay the journal buffer 215 corresponding to the requested one or more segments in an order corresponding to the request, based on the page number to recreate the requested one or more segments.

In this manner, the storage device 300 as described herein may potentially reduce the open time of a memory device such as a SSD, therefore potentially improving the performance of the storage device 300 and of the host device 308 using the storage device 300. The storage device 300 may also improve booting process time and enable the storage device 300 to be booted faster. Consequently, the storage device 300 may enables the memory device to become ready for use in a shorter amount of time.

FIG. 4 illustrates a flow chart of a method 400 for reducing the open time of a memory device, such as an SSD, for example. The method 400 may be described in the general context of computer executable instructions. Generally, computer executable instructions may include routines, programs, objects, components, data structures, procedures, modules, and functions, which perform specific functions or implement specific abstract data types.

The order in which the method 400 is described is not intended to be construed as a limitation, and any number of the described method blocks may be combined in any order to implement the method. Alternatively or additionally, individual blocks may be deleted from the methods without departing from the spirit and scope of the subject matter described.

At step 402, once the L2P address mapping table of a SSD is loaded into a faster memory such as volatile memory, the L2P address mapping table may be divided into a plurality of S segments. The number (e.g., quantity) of the plurality of the S segments may be determined based on a command timeout time, a power loss protection time, and resources available with the SSD.

At step 404, the method 400 may include creating a plurality of journal buffers for the plurality of S segments and assigning one journal buffer to each segment. Each journal buffer may store entries representing changes to respective segment of the L2P address mapping table made during write operations of the SSD.

At step 406, in event of sudden power loss, the entries of each journal buffer may be copied and/or stored into a non-volatile memory such as flash memory. At step 408, during a power on sequence, the method 400 includes replaying the entries of a subset of the plurality of the journal buffers stored in the non-volatile memory in order to recreate subset K of the plurality of S segments, and recreating remaining S−K segments of the plurality of S segments in a background mode. The subset of the journal buffers corresponds to the subset of the K segments.

According to an embodiment of the present disclosure, the number of segments in the subset K of the plurality of S segments, to be recreated during the power on sequence, is determined based on expected open time and command timeout time. Alternatively or additionally, the number of segments to be recreated during the power on sequence is selected such that time to recreate remaining segments is less than a command time out time. Further, recreating the remaining S−K segments of the plurality of S segments in the background comprises replaying remaining journal buffers of the plurality of the journal buffers in the background in order to recreate the remaining S−K segments of the plurality of S segments upon the successful recreation of the subset K of the plurality of S segments.

At step 410, the method 400 includes sending, to host device 308, a device-ready signal upon successful recreation of the subset K of the plurality of S segments to reduce the SSD open time. According to an embodiment of the present disclosure, the method may also include receiving a request to recreate one or more of the remaining S−K segments in a particular order. In response, the journal buffers corresponding to the requested one or more S-K segments are replayed in the particular order to recreate the requested one or more segments.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processing device may be stored. Thus, a computer-readable storage medium may store instructions for execution by the processing device, including instructions for causing the processing device to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors include, by way of example, a general-purpose processor, a special purpose processor, a conventional processor, a digital signal processor (DSP), a graphic processing unit (GPU), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In an embodiment, the present disclosure provides techniques for reducing open time for a memory device.

In an embodiment, the present disclosure provides the techniques to boot (e.g., power on) the memory device in a shorter amount of time.

In an embodiment, the present disclosure provides techniques for improving the performance of the memory device.

What is claimed is:

1. A method for reducing open time of a Solid-State Drive (SSD), the method comprising:
    dividing a logical-to-physical (L2P) address mapping table of the SSD into a plurality of segments;
    creating a plurality of journal buffers for the plurality of segments;
    assigning one journal buffer of the plurality of journal buffers to each segment of the plurality of segments, wherein each journal buffer of the plurality of journal buffers stores entries representing changes made, during one or more write operations of the SSD, to the assigned segment of the L2P address mapping table;
    recreating, during a power on sequence of the SSD, a portion of the plurality of segments by replaying a first subset of the plurality of journal buffers corresponding to the portion of the plurality of segments;
    sending, to a host device, a device-ready signal upon successful recreation of the portion of the plurality of segments; and
    recreating, in a background mode, a remaining portion of the plurality of segments by replaying a second subset of the plurality of journal buffers corresponding to the remaining portion of the plurality of segments.

2. The method of claim 1, further comprising:
    in response to a sudden power loss event, copying entries of each journal buffer of the plurality of journal buffers into a non-volatile memory of the SSD.

3. The method of claim 1, wherein the recreating of the remaining portion of the plurality of segments comprises:
    replaying, in the background mode, remaining journal buffers of the plurality of journal buffers, in response to the successful recreation of the portion of the plurality of segments.

4. The method of claim 1, further comprising:
    determining a quantity of segments in the plurality of segments based on a command timeout time, a power loss protection time, and resources available with the SSD.

5. The method of claim 1, further comprising:
    determining a quantity of segments in the portion of the plurality of segments based on an expected open time and a command timeout time.

6. The method of claim 1, further comprising:
    determining a quantity of segments in the portion of the plurality of segments to be recreated during the power on sequence such that a time to recreate the remaining portion of the plurality of segments is less than a command timeout time.

7. The method of claim 1, further comprising:
    receiving a request to recreate one or more segments of the remaining portion of the plurality of segments in a particular order,
    wherein the recreating of the remaining portion of the plurality of segments comprises replaying a third subset of the plurality of journal buffers according to the particular order, wherein the third subset of the plurality of journal buffers correspond to the one or more segments indicated by the request.

8. A system for reducing open time of a Solid-State Drive (SSD), the system comprises:
    at least one controller;
    a volatile memory communicatively coupled with the at least one controller; and
    a non-volatile memory communicatively coupled with the at least one controller and the volatile memory;
    wherein the at least one controller is configured to:
        divide a logical-to-physical (L2P) address mapping table of the SSD, stored in the volatile memory, into a plurality of segments;
        create a plurality of journal buffers for the plurality of segments;
        assign one journal buffer of the plurality of journal buffers to each segment of the plurality of segments, wherein each journal buffer of the plurality of journal buffers stores entries representing changes made, during one or more write operations of the SSD, to the assigned segment of the L2P address mapping table;

recreate, during a power on sequence of the SSD, a portion of the plurality of segments by replaying a first subset of the plurality of journal buffers corresponding to the portion of the plurality of segments, the first subset of the plurality of journal buffers being previously stored in the non-volatile memory;

send, to a host device, a device-ready signal upon successful recreation of the portion of the plurality of segments; and recreate, in a background mode, a remaining portion of the plurality of segments by replaying a second subset of the plurality of journal buffers corresponding to the remaining portion of the plurality of segments, the second subset of the plurality of journal buffers being previously stored in the non-volatile memory.

9. The system of claim 8, wherein the at least one controller is further configured to:

in response to a sudden power loss event, copy entries of each journal buffer of the plurality of journal buffers into the non-volatile memory.

10. The system of claim 8, wherein to recreate the remaining portion of the plurality of segments, the at least one controller is further configured to:

replay, in the background mode, remaining journal buffers of the plurality of journal buffers, in response to the successful recreation of the portion of the plurality of segments.

11. The system of claim 8, wherein the at least one controller is further configured to:

determine a quantity of segments in the plurality of segments based on a command timeout time, a power loss protection time, and resources available with the SSD.

12. The system of claim 8, wherein the at least one controller is further configured to:

determine a quantity of segments in the portion of the plurality of segments based on an expected open time and a command timeout time.

13. The system of claim 8, wherein the at least one controller is further configured to:

determine a quantity of segments in the portion of the plurality of segments to be recreated during the power on sequence such that a time to recreate the remaining portion of the plurality of segments "is less than a command timeout time.

14. The system of claim 8, wherein the at least one controller is further configured to:

receive a request to recreate one or more segments of the remaining portion of the plurality of segments in a particular order; and replay a third subset of the plurality of journal buffers according to the particular order, wherein the third subset of the plurality of journal buffers correspond to the one or more segments indicated by the request.

15. A non-transitory computer-readable storage medium comprising instructions that are executable by a processing device of a solid-state device (SSD), and cause the SSD to:

divide a logical-to-physical (L2P) address mapping table of the SSD into a plurality of segments;

create a plurality of journal buffers for the plurality of segments;

assign one journal buffer of the plurality of journal buffers to each segment of the plurality of segments, wherein each journal buffer of the plurality of journal buffers stores entries representing changes made, during one or more write operations of the SSD, to the assigned segment of the L2P address mapping table;

recreate, during a power on sequence of the SSD, a portion of the plurality of segments by replaying a first subset of the plurality of journal buffers corresponding to the portion of the plurality of segments;

send, to a host device, a device-ready signal upon successful recreation of the portion of the plurality of segments; and recreate, in a background mode, a remaining portion of the plurality of segments by replaying a second subset of the plurality of journal buffers corresponding to the remaining portion of the plurality of segments.

16. The non-transitory computer-readable storage medium of claim 15, wherein the instructions further cause the SSD to:

in response to a sudden power loss event, copy entries of each journal buffer of the plurality of journal buffers into a non-volatile memory of the SSD.

17. The non-transitory computer-readable storage medium of claim 15, wherein the instructions to recreate the remaining portion of the plurality of segments further cause the SSD to:

replay, in the background mode, remaining journal buffers of the plurality of journal buffers, in response to the successful recreation of the portion of the plurality of segments.

18. The non-transitory computer-readable storage medium of claim 15, wherein the instructions further cause the SSD to:

determine a quantity of segments in the plurality of segments based on a command timeout time, a power loss protection time, and resources available with the SSD.

19. The non-transitory computer-readable storage medium of claim 15, wherein the instructions further cause the SSD to:

determine a quantity of segments in the portion of the plurality of segments based on an expected open time and a command timeout time.

20. The non-transitory computer-readable storage medium of claim 15, wherein the instructions further cause the SSD to:

determine a quantity of segments in the portion of the plurality of segments to be recreated during the power on sequence such that a time to recreate the remaining portion of the plurality of segments is less than a command timeout time.

* * * * *